(12) United States Patent
Zinn et al.

(10) Patent No.: US 9,378,861 B2
(45) Date of Patent: Jun. 28, 2016

(54) NANOPARTICLE COMPOSITION AND METHODS OF MAKING THE SAME

(71) Applicant: Lockheed Martin Corporation, Bethesda, MD (US)

(72) Inventors: Alfred A. Zinn, Palo Alto, CA (US); Paul P. Lu, Playa Vista, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 223 days.

(21) Appl. No.: 13/919,929

(22) Filed: Jun. 17, 2013

(65) Prior Publication Data

US 2014/0003991 A1    Jan. 2, 2014

Related U.S. Application Data

(63) Continuation of application No. 12/813,463, filed on Jun. 10, 2010, now Pat. No. 8,486,305.

(60) Provisional application No. 61/265,326, filed on Nov. 30, 2009.

(51) Int. Cl.
*H01B 1/22* (2006.01)
*C09D 5/24* (2006.01)
(Continued)

(52) U.S. Cl.
CPC ............... *H01B 1/22* (2013.01); *B22F 1/0018* (2013.01); *B22F 9/24* (2013.01); *B82Y 30/00* (2013.01); *C22B 15/0089* (2013.01); *Y10T 428/2991* (2015.01)

(58) Field of Classification Search
CPC .............. H01B 1/00; H01B 1/06; H01B 1/16; H01B 1/22; C09D 5/24; C09D 11/324; C09D 11/52
See application file for complete search history.

(56) References Cited

U.S. PATENT DOCUMENTS 3,332,916 A    7/1967   Hay
3,637,508 A    1/1972   Willsey et al.
(Continued)

FOREIGN PATENT DOCUMENTS

EP    1921176 A2    5/2008
EP    2098316 A2    9/2009
(Continued)

OTHER PUBLICATIONS

Kanninen, et al., "Influence of Ligand Structure on the Stability and Oxidation of Copper Nanoparticles", Journal of Colloid and Interface Science 318 (2008) pp. 88-95.
(Continued)

*Primary Examiner* — Mark Kopec
(74) *Attorney, Agent, or Firm* — McDermott Will & Emery LLP

(57) ABSTRACT

A method of fabricating copper nanoparticles includes heating a copper salt solution that includes a copper salt, an N,N'-dialkylethylenediamine, and a C6-C18 alkylamine in an organic solvent to a temperature between about 30° C. to about 50° C.; heating a reducing agent solution that includes a reducing agent, an N,N'-dialkylethylenediamine, and a C6-C18 alkylamine in an organic solvent to a temperature between about 30° C. to about 50° C.; and adding the heated copper salt solution to the heated reducing agent solution, thereby producing copper nanoparticles. A composition includes copper nanoparticles, a C6-C18 alkylamine and an N,N'-dialkylethylenediamine ligand. Such copper nanoparticles in this composition have a fusion temperature between about 100° C. to about 200° C. A surfactant system for the stabilizing copper nanoparticles includes an N,N'-dialkylethylenediamine and a C6-C18 alkylamine.

13 Claims, 4 Drawing Sheets

(51) Int. Cl.
  *B22F 1/00* (2006.01)
  *B22F 9/24* (2006.01)
  *B82Y 30/00* (2011.01)
  *C22B 15/00* (2006.01)

(56) References Cited

U.S. PATENT DOCUMENTS

| | | | |
|---|---|---|---|
| 4,931,323 A | 6/1990 | Manitt et al. | |
| 5,147,841 A | 9/1992 | Wilcoxon | |
| 5,159,171 A | 10/1992 | Cook et al. | |
| 5,800,650 A | 9/1998 | Anderson et al. | |
| 5,958,590 A | 9/1999 | Kang et al. | |
| 6,143,356 A | 11/2000 | Jablonski | |
| 6,348,295 B1 | 2/2002 | Griffith et al. | |
| 6,358,627 B2 | 3/2002 | Benenati et al. | |
| 6,645,444 B2 | 11/2003 | Goldstein | |
| 6,730,400 B1 | 5/2004 | Komatsu et al. | |
| 6,783,569 B2 | 8/2004 | Cheon et al. | |
| 7,118,843 B2 | 10/2006 | Teshima | |
| 7,306,823 B2 | 12/2007 | Sager et al. | |
| 7,419,887 B1 | 9/2008 | Quick et al. | |
| 7,442,879 B2 | 10/2008 | Das et al. | |
| 7,524,351 B2 | 4/2009 | Hua et al. | |
| 7,559,970 B2 | 7/2009 | Kim et al. | |
| 7,628,840 B2 | 12/2009 | Atsuki et al. | |
| 7,637,982 B2 | 12/2009 | Hou et al. | |
| 7,682,970 B2 | 3/2010 | Grigoropoulos et al. | |
| 7,736,414 B1 | 6/2010 | Zinn | |
| 7,743,964 B2 | 6/2010 | Maeda | |
| 7,847,397 B2 | 12/2010 | Wu et al. | |
| 7,850,933 B2 | 12/2010 | Yang et al. | |
| 7,858,025 B2 | 12/2010 | Shim et al. | |
| 8,105,414 B2 | 1/2012 | Zinn | |
| 8,486,305 B2 | 7/2013 | Zinn et al. | |
| 8,834,747 B2 | 9/2014 | Zinn | |
| 9,011,570 B2 | 4/2015 | Bedworth et al. | |
| 2003/0100654 A1 | 5/2003 | Chheang et al. | |
| 2003/0146019 A1 | 8/2003 | Hirai | |
| 2004/0216517 A1 | 11/2004 | Xi et al. | |
| 2004/0245648 A1 | 12/2004 | Nagasawa et al. | |
| 2005/0058771 A1 | 3/2005 | Herron et al. | |
| 2005/0249967 A1 | 11/2005 | Egli | |
| 2006/0003156 A1 | 1/2006 | Masutani et al. | |
| 2006/0068216 A1 | 3/2006 | Hua et al. | |
| 2006/0189113 A1 | 8/2006 | Vanheusden et al. | |
| 2006/0196579 A1 | 9/2006 | Skipor et al. | |
| 2007/0006914 A1 | 1/2007 | Lee | |
| 2007/0007033 A1 | 1/2007 | Das et al. | |
| 2007/0131912 A1 | 6/2007 | Simone et al. | |
| 2007/0202304 A1 | 8/2007 | Golovko et al. | |
| 2007/0290175 A1 | 12/2007 | Kim | |
| 2008/0003364 A1* | 1/2008 | Ginley et al. | 427/276 |
| 2008/0011125 A1 | 1/2008 | Shirata et al. | |
| 2008/0032132 A1 | 2/2008 | Woodfield et al. | |
| 2008/0072706 A1 | 3/2008 | Lee et al. | |
| 2008/0124268 A1 | 5/2008 | Yang et al. | |
| 2008/0149176 A1 | 6/2008 | Sager et al. | |
| 2008/0151515 A1 | 6/2008 | Das et al. | |
| 2008/0159902 A1 | 7/2008 | Shim et al. | |
| 2008/0160183 A1 | 7/2008 | Ide et al. | |
| 2008/0278181 A1 | 11/2008 | Zhong et al. | |
| 2008/0286488 A1 | 11/2008 | Li et al. | |
| 2009/0029148 A1 | 1/2009 | Hashimoto et al. | |
| 2009/0145765 A1 | 6/2009 | Abys et al. | |
| 2009/0148600 A1 | 6/2009 | Li et al. | |
| 2009/0181183 A1 | 7/2009 | Li et al. | |
| 2009/0214764 A1 | 8/2009 | Li et al. | |
| 2009/0239073 A1 | 9/2009 | Huang et al. | |
| 2009/0274833 A1 | 11/2009 | Li et al. | |
| 2009/0274834 A1 | 11/2009 | Chopra et al. | |
| 2009/0285976 A1 | 11/2009 | Lochtman et al. | |
| 2009/0301606 A1 | 12/2009 | Ueshima | |
| 2010/0000762 A1 | 1/2010 | Yang et al. | |
| 2010/0031848 A1 | 2/2010 | Lee et al. | |
| 2010/0065616 A1 | 3/2010 | Zinn | |
| 2010/0075137 A1 | 3/2010 | Sinton et al. | |
| 2010/0139455 A1 | 6/2010 | Tilley et al. | |
| 2010/0275729 A1 | 11/2010 | Jun et al. | |
| 2010/0314578 A1 | 12/2010 | Purdy | |
| 2012/0114521 A1 | 5/2012 | Zinn | |

FOREIGN PATENT DOCUMENTS

| | | |
|---|---|---|
| JP | 2002-154199 A | 5/2002 |
| JP | 2003-295479 A | 10/2003 |
| JP | 2008-166086 A | 7/2008 |
| JP | 2009006337 A | 1/2009 |
| JP | 2009-084677 A | 4/2009 |
| JP | 2010-174313 A | 8/2010 |
| JP | 2010-528428 A | 8/2010 |
| JP | 2012-521493 A | 9/2012 |
| KR | 20080010691 A | 1/2008 |
| WO | WO-2006/063134 A2 | 6/2006 |
| WO | WO 2008/018718 | 2/2008 |
| WO | WO-2009/115643 A2 | 9/2009 |
| WO | WO-2010/030487 A1 | 3/2010 |
| WO | WO-2010/036114 A2 | 4/2010 |
| WO | WO-2011/065997 A1 | 6/2011 |

OTHER PUBLICATIONS

Lisiecki, et al., "Control of the Shape and the Size of Copper Metallic Particles", J. Phys. Chem 1996, 100, pp. 4160-4166.

Mott, et al., "Synthesis of Size-Controlled and Shaped Copper Nanoparticles", Langmuir 2007, 23, pp. 5740-5745.

Wu, et al., "Simple One-Step Synthesis of Uniform Disperse Copper Nanoparticles", Mater. Res. Soc. Symp. Proc. vol. 879E, 2005 Materials Research Society, pp. Z6.3.1-Z6.3.6.

Wu, et al., "One-Step Green Route to Narrowly Dispersed Copper Nanocrystals", Journal of Nanoparticle Research (2006) pp. 965-969.

Yeshchenko, et al., "Size-Dependent Melting of Spherical Copper Nanoparticles Embedded in a Silica Matrix", Physical Review B 75 (2007), pp. 085434-1 to 085434-6.

Pulkkinen, et al., "Poly(ethylene imine) and Tetraethylenepentamine as Protecting Agents for Metallic Copper Nanoparticles", Applied Materials & Interfaces, (200) vol. 1, No. 2, pp. 519-525.

Product Description—"Copper Nanoparticle and Cupric Salt Product Specialized Team", Suzhou Cantuo Nano Technology Co. Ltd. 2010.

Product Description—"Nano-Copper", Sun Innovations, Inc. 2005-2010.

Product Description—"Copper Nanoparticle, Cu", NaBond Technologies Co., Ltd. 2001-2009.

Product Description—"Copper Nanoparticles", American Elements 2001-2010.

Product Description—"Powders: Nanoparticles & Nanopowders", SkySpring Nanomaterials, Inc.

Product Description—"Copper Nano Powder" TradeKey 2011.

Product Description—Metal & Alloy Nanoparticles, Nanoshel 2007-2009.

Product Description—"Nanopowders" Sigma-Aldrich 2010.

Product Description—Copper Nanoparticle (Copper Nanopowder), Suzhou Canfuo Nano Technology Co., Ltd. 1997-2011.

Chu et al., "Thermal Aqueous Solution Approach for the Synthesis of Triangular and Hexagonal Gold Nanoplates with Three Different Size Ranges", Inorganic Chemistry, 2006, pp. 808-813, vol. 45.

Aslam, et al., "Formation of Cu and Cu.sub.2O Nanoparticles by Variation of the Surface Ligand: Preparation, Structure, and Insulating-to-Metallic Transition", Journal of Colloid and Interface Science, 2002, pp. 79-90.

Masala, et al., "Synthesis Routes for Large Volumes of Nanoparticles", Annu. Rev. Mater. Res., 2004, pp. 41-81.

Gupta, Vaibhav, "Synthesis of Metallic Nanoparticles and Their Applications", Department of Research and Advanced Studies of the University of Cincinnati, 2006.

Wu, et al., "Simple One-Sstep Synthesis of Uniform Disperse Copper Nanoparticles", Mater. Res. Soc. Symp. Proc. 2005, vol. 879E, pp. Z6.3.1-Z6.3.6.

(56) References Cited

OTHER PUBLICATIONS

Basolo, et al., "Steric Effects and the Stability of Complex Compounds. II. The Chelating Tendencies of N,N'-Dialkylethylenediamines with Copper (II) and Nickel (II) Ions", J. Am. Chem. Soc. (1954) vol. 76 (1), pp. 211-214.

Foresti, et al., "New Thiophene Monolayer Protected Copper Nanoparticles: Synthesis and Chemical-Physical Characterization," Alma Mater Studiorum Bologna University, Bologna, Italy, 2008.

Huaman, et al., "Copper Nanoparticles synthesized by hydroxyl ion assisted alcohol reduction for conducting ink," Journal of Materials Chemistry, 2011, vol. 21, pp. 7062-7069.

Jang, et al., "Sintering of Inkjet Printed Copper Nanoparticles for Flexible Electronics," Scripta Materialia, 2010, vol. 62, pp. 258-261.

Jiang, et al., "Size-dependent melting properties of tin nanoparticles," Chemical Physics Letters, 2006, vol. 429, pp. 492-496.

Kang, et al., "Inkjet Printed Electronics Using Copper Nanoparticle Ink", J Mater Sci: Mater Electron (2010) vol. 21 pp. 1213-1220.

Kogiso, et al., "One-dimensional organization of copper nanoparticles by chemical reduction of lipid-copper hybrid nanofibers," Chem Comm, 2002, pp. 2492-2493.

Magdassi, et al., "Copper Nanoparticles for Printed Electronics: Routes Towards Achieving Oxidation Stability", Materials (2010) vol. 3, pp. 4626-4638.

Mirjalili, et al., "Predictino of nanoparticles' size-dependent melting temperature using mean coordination number concept," Journal of Physics and Chemistry of Solids, 2008, vol. 69, pp. 2116-2123.

Murai, et al., "Preparation of copper nanoparticles with an organic coating by a pulsed wire discharge method," Journal of Ceramic Processing Research, 2007, vol. 8, No. 2, pp. 114-118.

Shandiz, et al., "Effective coordination number model for the size dependency of physical properties of nanocrystals," Journal of Physics: Condensed Matter, 2008, vol. 20, 9 pages.

Wang, et al., "Poly(allylamine)-Stabilized Colloidal Copper Nanoparticles: Synthesis, Morphology, and Their Surface-Enhanced Raman Scattering Properties", Langmuir Article (2010) vol. 26 (10), pp. 7469-7474.

Wu, et al., "Synthesis of high-concentration CU nanoparticles in aqueous CTAB solutions," J. Colloid and Interface Science 2004, 273, pp. 165-169.

Yonezawa, et al., "The preparation of copper fine particle paste and its application as the inner electrode material of a multilayered ceramic capacitor," Nanotechnology, 2008, vol. 19, 5 pages.

Lin, et al., "The influence of nano-particles on microstructural development at the interface of Sn3.5Ag-solder and Cu-substrate," Int J Nanomanufacturing, 2007, vol. 1, No. 3, pp. 357-369.

* cited by examiner

NANOPARTICLE COMPOSITION AND METHODS OF MAKING THE SAME

CROSS-REFERENCE TO RELATED APPLICATIONS

This application is a continuation of U.S. patent application Ser. No. 12/813,463, filed on Jun. 10, 2010, which claims the benefit of priority under 35 U.S.C. §119 from U.S. Provisional Patent Application No. 61/265,326, filed on Nov. 30, 2009, each of which is incorporated herein by reference in its entirety.

STATEMENT REGARDING FEDERALLY SPONSORED RESEARCH OR DEVELOPMENT

The invention was made with Government support, and the Government has certain rights in the invention under Contract No. 700KZ8101000 awarded by SEAM.

FIELD

The present invention generally relates to nanoparticles, and more particularly to metal nanoparticles.

BACKGROUND

The formation of mondisperse copper nanoparticles remains a challenge. Chemical reduction methods in solution and in reverse micelles have provided inadequate results providing particles having irregular shapes and/or wide size distributions. A recent example utilizing a hypophosphite reducing system in the presence of polyvinlypyrrolidone (PVP) has provided monodisperse particles of relatively large sizes, between about 30-65 nm. A thermal CVD route to copper nanoparticles by decomposition of $Cu[OCH(Me)CH_2NMe_2]$ has provided smaller nanoparticles on the order of 7.5 nm, but is not conducive to scale up and has not demonstrated access to even smaller particles. It would be beneficial to provide new scalable, cost-effective methods for the production of monodisperse copper nanoparticles having small effective diameters. The present invention satisfies this need and provides related advantages as well.

SUMMARY

In some aspects, embodiments disclosed herein relate to a method of fabricating copper nanoparticles that includes: heating a copper salt solution comprising a copper salt, an N,N'-dialkylethylenediamine, and a C6-C18 alkylamine in an organic solvent to a temperature between about 30° C. to about 50° C.; heating a reducing agent solution comprising a reducing agent, an N,N'-dialkylethylenediamine, and a C6-C18 alkylamine in an organic solvent to a temperature between about 30° C. to about 50° C.; and adding the heated copper salt solution to the heated reducing agent solution, thereby producing copper nanoparticles.

In some aspects, embodiments disclosed herein relate to a composition that includes copper nanoparticles, a C6-C18 alkylamine and an N,N'-dialkylethylenediamine ligand. The copper nanoparticles of the composition have a fusion temperature between about 100° C. to about 200° C.

In some aspects, embodiments disclosed herein relate to a surfactant system for the stabilizing copper nanoparticles that includes an N,N'-dialkylethylenediamine and a C6-C18 alkylamine.

DETAILED DESCRIPTION

Figure 1:
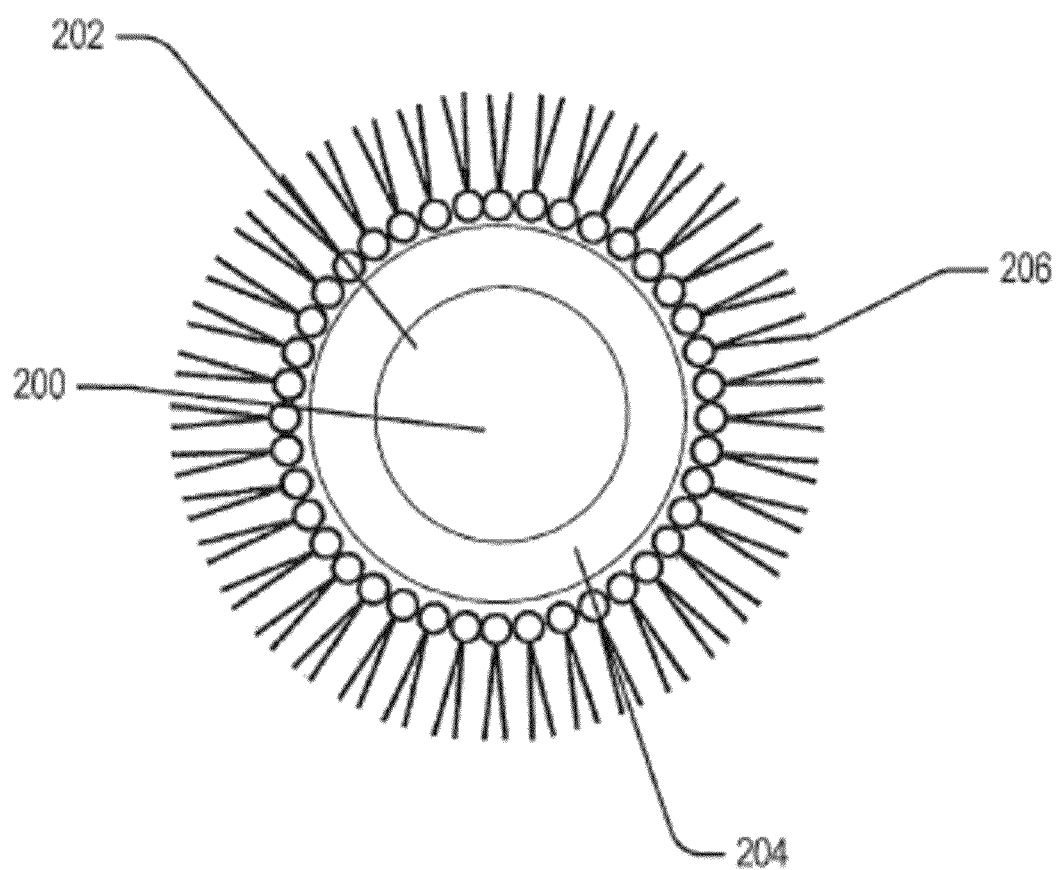
FIG. 1 shows the structure of a surfactant stabilized nanoparticle of the present invention.

Aspects disclosed herein relate to U.S. patent application Ser. No. 12/512,315, entitled "LEAD SOLDER-FREE ELECTRONICS," filed on Jul. 30, 2009. In some aspects, improvements in the synthesis of copper nanoparticles are provided, including the synthesis of copper (Cu) nanoparticles having a 3-5 nanometer (nm) size and smaller.

The present invention is directed, in part, to a method for producing monodisperse small diameter copper nanoparticles. The method employs surfactants including bidentate amines, such as N,N'-dimethylethylenediamine and N,N'-di-tert-butylethylenediamine, in the presence of medium to long chain alkylamines, under reducing conditions to provide readily scalable quantities of Cu nanoparticles (Cu NPs). Without being bound by theory, the N,N'-dialkylethylenediamines can effectively bond and stabilize the nascent Cu NPs sufficiently to produce smaller Cu NPs than those available via reducing conditions as known in the art. In some aspects, the method can provide very small Cu NPs including Cu NPs having an effective diameter of 5 nm and smaller. The methods of the invention provide fully dispersed particles that avoid agglomeration, and can also produce excellent control over particle size at below 5 nm.

Another feature of the method is the order of addition of the copper salt solution and the reducing agent solution. Reliable results are obtained by adding the copper salt solution into a reducing agent solution, as opposed to the other way around. In addition to providing small diameter Cu NPs, methods of the invention can provide nanodispersed copper(I) chloride (CuCl) that allows the controlled formation of very small nanoparticles. In some aspects, these Cu NPs produced by methods of the present invention can fuse at about 100° C. to thin copper films.

The present invention is also directed, in part, to the stabilized Cu NPs made available by the methods described above. Cu NPs having diameters between 1 and 10 nm, for example, can be used as a lead free solder in electronics manufacturing. Moreover, the small diameter stabilized Cu NPs of the invention are useful in various catalytic chemical processes including the water-gas-shift reaction and in cross-coupling chemistry, such as Glaser couplings, Suzuki-Miyaura coupling of boronates and vinyl or aryl halides, the Ullmann reaction, and other copper mediated chemistry. Cu NPs of the present invention can also display unique optical and electrical properties as well.

Cu NPs of the invention can have applications in nanoelectronics and photonics materials, such as MEMS and NEMS, in biomaterials, as biomarkers, diagnostics and sensors, in nanomaterials, such as in polymers, textiles, fuel cell layers, composites and solar energy materials. Still further applications of Cu NPs of the invention include their use in antimicrobial formulations, antibiotic and antifungal agents, including their incorporation in coatings, plastics and textiles, and in copper diet supplements.

The Cu NPs of the invention are made available in scalable quantities with very small diameters in a stabilized form. Cu NPs of 5 nm or less are readily prepared, using methods of the present invention, from inexpensive copper salts and reducing agents with inexpensive solvents, under mild heating conditions, 30-50° C. By contrast, methods in the art employing Cu(acac)$_2$ in the presence of 1,2-hexadecanediol as a reducing agent are conducted at temperatures in excess of 150° C. in expensive octyl ether solvent. Moreover, the stabilized Cu NPs of the present invention can exhibit fusion at temperatures as low as 100° C.

As used herein, the term "copper salt" refers to any salt of copper in any of its common oxidations states, including cuprous salts, Cu(I), and cupric salts, Cu(II).

As used herein, the term "organic solvent" refers generally to polar aprotic solvents. Useful organic solvents of the invention are capable of solubilizing or acting as co-solvents to solubilize the copper salts and reducing agents.

In some embodiments, the present invention provides a method of fabricating copper nanoparticles that includes 1) heating a copper salt solution that includes a copper salt, an N,N'-dialkylethylenediamine, and a C6-C18 alkylamine in an organic solvent to a temperature between about 30° C. to about 50° C.; 2) heating a reducing agent solution that includes a reducing agent, an N,N'-dialkylethylenediamine, and a C6-C18 alkylamine in an organic solvent to a temperature between about 30° C. to about 50° C.; and 3) rapidly adding the heated copper salt solution to the heated reducing agent solution, thereby producing copper nanoparticles (Cu NPs).

In carrying out methods of the invention, the heating of the substrate copper salt solution and the reducing agent solution avoids uneven temperatures on mixing and allows for rapid addition of the two solutions. It has been observed that reliable results are provided by adding the copper solution to the reducing agent rapidly, rather than adding the reducing agent solution to the copper solution. In some embodiments, rapid addition means adding the copper salt solution to the reducing agent solution in less than 5 minutes. In some embodiments, rapid addition means adding the copper salt solution to the reducing agent solution in less than 4 minutes, in less than 3 minutes in other embodiments, in less than 2 minutes in still further embodiments, and in less than 1 minute in yet still further embodiments.

In some embodiments, the Cu NPs formed by methods of the present invention can be used in situ without further isolation. In other embodiments, a work up of the reaction can be performed to purify and isolate the CuNPs. Such purification can include a series of rinses, sonication, and centrifugation steps as described in Example I below.

In some embodiments, the copper salt used in methods of the present invention is selected from a copper halide, copper nitrate, copper acetate, copper sulfate, copper formate, and copper oxide. Other copper (I) or copper (II) salts can be used as well. One skilled in the art will recognize the benefit of choosing a copper salt having good solubility in the organic solvent being employed. Moreover, the choice of copper salt can be a function of cost and scale. Methods of the present invention when conducted on large scale can use inexpensive copper halide salts, for example. In some embodiments, the copper salt is a copper halide selected from copper chloride, copper bromide, and copper iodide. In particular embodiments, the copper salt is copper chloride.

In some embodiments, methods of the present invention are carried out in an organic solvent. The organic solvent can be anhydrous in some embodiments. The organic solvent can be any polar aprotic capable of at least partially solubizing the copper salt and reducing agent. In some embodiments, the organic solvent is triglyme which dissolves the copper chloride precursor effectively while also activating the reducing agent sodium borohydride (NaBH$_4$). By contrast, simple ethers, like diethyl ether, do not readily dissolve such a reducing agent. The organic solvent need not on its own dissolve the copper salt. In some embodiments, the presence of the N,N'-dialkylethylenediamine, the C6-C18 alkylamine, or both in combination can enhance the solubility of the copper salt through the formation of copper-organic ligand complex.

In some embodiments, methods of the present invention employ an N,N'-dialkylethylenediamine which includes a C1-C4 N,N'-dialkylethylenediamine. As bidentate ligands, N,N'-dialkylethylenediamines can coordinate metal atoms at two nitrogen atoms, which can stabilize the formation of small diameter Cu NPs. In some embodiments, the alkyl groups of the C1-C4 N,N'-dialkylethylenediamine are the same, while in other embodiments they are different. The C1-C4 alkyl groups include methyl, ethyl, propyl, butyl, and the like, including normal chain or branched alkyl groups such as iso-propyl, iso-butyl, sec-butyl, and tert-butyl groups. Other bidentate, tridentate, and multidentate ligands can also be employed. For example, N,N'-dialkylpropylenediamines can also be used.

The amount of N,N'-dialkylpropylenediamine employed in the reaction is in a range from between about 12 percent to about 16 percent by volume based on the total reaction mixture after addition of the solution containing the reducing agent.

In some embodiments, methods of the invention use C6-C18 alkylamines. In some embodiments the alkylamine employed is a C7-C10 alkylamine. Although, a C5 or C6 alkylamine can also be used. Likewise, a C11 or C12 alkyl amine can also be used. The exact size of alkylamine to be employed can be a balance between being long enough to provide an effective inverse micellar structure versus the ready volatility and/or ease of handling. For example, alkylamines with more than 18 carbons while also usable, can be more difficult to handle because of their waxy character. Alkylamines between C7 and C10, inclusive, represent a good balance of desired properties for ease of use. In some embodiments, the C6-C18 alkylamine is n-heptylamine. In some embodiments, the C6-C18 alkylamine is n-octylamine. In some embodiments the C6-C18 alkylamine is n-nonylamine. While these are all normal chain amines, one skilled in the art will appreciate that some extent of branching can also be used. For example, 7-methyloctylamine can also be used. Without being bound by theory, the monoalkylamines described above can also serve as ligands in the coordination sphere of copper atoms. However, their ability to dissociate from the copper center is facilitated by the single point of attachment.

The amount of C6-C18 alkylamine employed in the reaction is in a range from between about 10 to about 15% based on the total reaction mixture after addition of the solution containing the reducing agent. Moreover, the ratio of the N,N'-dialkylpropylenediamine to C6-C18 alkylamine can be in a range from between about 1:1 to about 2:1.

In some embodiments, the methods of the invention also include a solution of a reducing agent. The reduction of copper salts by a variety of reducing agents are known in the art. A reducing agent can be chosen that will reduce copper (II) to copper (0), copper (I), or mixtures thereof. One skilled in the art will recognize that when employing a hydride based reducing agent, the hydride source will provide the requisite change in copper oxidation state and avoid the formation of copper hydride species. In some embodiments, the reducing agent is a hydride-based reagent such as sodium borohydride.

In some embodiments, methods of the invention produce copper nanoparticles in a range of sizes from between about 1 nm to about 10 nm when the temperature used to mix the solution of copper salt and reducing agent are in a range between about 30° C. to about 50° C. The size of the Cu NPs formed is sensitive to temperature. For example, when heating of the solution of copper salt and solution of reducing agent is in a range from between about 30° C. to about 45° C., the resultant copper nanoparticles range in size from between about 1 nm to about 5 nm. Similarly, when heating copper salt and reducing agent solutions in a range from between about 45° C. to about 50° C., the resultant copper nanoparticles range in size from between about 5 nm to about 10 nm. The control of the temperature over this narrow range is facilitated by the separate heating of the copper salt solution and reducing agent solution prior to mixing.

In some embodiments, the present invention provides a stabilized copper nanoparticle made by the methods described herein above. Such Cu NPs can range in size from between about 1 nm to about 10 nm. Without being bound by theory, the Cu Nps are stabilized by the presence of the C6-C18 alkylamine or N,N'-dialkylethylenediamine, or the combination of the two. The association of these ligands are shown in FIG. 1. The nanoparticle 200 shown in FIG. 1 includes a dense core 202, a lower density shell 204, with indications of a smooth transition between the two. Finally, the protected nanoparticle includes a protective surfactant layer 206. The procedure for generating nanoparticles of the invention are described further below in the Example.

In some embodiments, the stabilized Cu NPs range in size from about 1 nm to about 10 nm. In other embodiments, the stabilized Cu NPs range in size from between about 1 nm to about 5 nm. In still further embodiments, the Cu NPs range in size from between about 2 nm to about 5 nm. In yet still further embodiments, the Cu NPs range in size from between about 3 nm to about 5 nm. In yet other embodiments, the Cu NPs range in size from between about 5 nm to about 10 nm. The Cu NPs of the invention are monodisperse and generally spherical in geometry, see Example below.

Based on the methods described herein above, the present invention provides a composition that includes copper nanoparticles, a C6-C18 alkylamine and an N,N'-dialkylethylenediamine ligand. These copper nanoparticles are stabilized and are useful in a variety of applications. As described above the C6-C18 alkylamine can play a role in the stabilization of the Cu NPs. In particular embodiments, the C6-C18 alkylamine used to stabilize the Cu NPs is a C7-C10 alkylamine, such as n-heptylamine, n-octylamine, n-nonylamine, or n-decylamine. In exemplary embodiments, the N,N'-dialkylethylenediamine is N,N'-dimethylethylenediamine or N,N'-di-t-butylethylenediamine. In some embodiments, the Cu NPs of the invention can have a fusion temperature between about 100° C. to about 200° C., providing a material that can be used as a low melt solder. One skilled in the art will recognize the size dependence on the observed fusion temperature. Thus, smaller Cu NPs of the invention display lower fusion temperatures.

The low fusion temperatures of the Cu NPs of the invention provide a lead-free solder for electronics applications. Similar approaches use silver and gold ink with a fusion temperature of about 200° C. (e.g. NanoMas Inc.) and even above 300° C. (Virginia Institute of Technology) at a cost of about $1,000 per gram. Cu NPs of the invention provide a substantial cost reduction over these approaches. The process to make the Cu NPs described herein is readily scalable and allows low cost mass production. In some embodiments, the Cu Nps of the invention are used in a formulation of ink for ink jet printing of conducting vias. This can be useful in the production of a low cost flexible thin film solar cell, for example.

In some embodiments, the present invention provides a surfactant system for the stabilizing copper nanoparticles comprising an N,N'-dialkylethylenediamine and a C6-C18 alkylamine. In some such embodiments, the N,N'-dialkylethylenediamine and a C6-C18 alkylamine are present in a ratio from between about 1:1 to about 2:1. One skilled in the art will recognize that the dual surfactant system having the bidentate N,N'-dialkylethylenediamine and a C6-C18 alkylamine can be used in conjunction with the preparation of other metal nanoparticles. For example, this surfactant system can be used to generate NPs of silver, gold, rhodium, rhenium, nickel, palladium, platinum, and other transition metals, or transition metal oxides, and other salts.

It is understood that modifications which do not substantially affect the activity of the various embodiments of this invention are also included within the definition of the invention provided herein. Accordingly, the following example is intended to illustrate but not limit the present invention.

EXAMPLE I

This Example shows an exemplary preparation and characterization of Cu NPs, in accordance with some embodiments of the invention.

0.8 g of copper (II) chloride dihydrate were placed into a 250 mL 3 neck round bottom flask, evacuated and back-filled with Argon three times. A plastic syringe and a stainless steel needle was used to add the following surfactants in the order given and under positive Argon pressure: 4 mL of N,N'-di-tert-butylethylenediamine, 4 mL n-nonylamine and 45 mL degassed triglyme as the reaction medium. The color of the solution turned dark blue and was stirred and heated for 2 hours at 45° C.

A second 250 mL 3 neck round bottom flask was charged with 8 mL of dry 2.0 M sodium borohydride solution. A plastic syringe and a stainless steel needle was used to add the following surfactants in the order given and under positive Argon pressure: 4 mL of nonylamine and 6 mL of N,N'-di-tert-butylethylenediamine. The resulting solution was colorless, and was heated to 45° C. and stirred for 1 hour; when heat was applied to this solution, it turned slightly cloudy.

While keeping both flasks at 40° C., the copper (II) chloride solution was transferred to the flask containing sodium borohydride over a period of five minutes using a cannula. When transfer was complete the reaction looked dark purple. In 10 minutes, the mixture turned cloudy and stayed white for about 4 minutes. Subsequently, the reaction kept changing color from white, to yellow-brown and eventually became dark brown over the next five minutes. At this point, it was cooled down to −10° C. in a dry ice and acetone bath for 10 minutes.

The reaction mixture was centrifuged at 1000 RPM for 20 minutes, which resulted in a dark brown precipitate and a clear supernatant. The black precipitate was mixed with a solution of degassed hexane (80 mL) and dicyclohexylamine (10 mL), which was then sonicated for 10 minutes. The new mixture was centrifuged at 1000 RPM for 10 minutes, a black precipitate and clear supernatant was obtained. The black precipitate was mixed with a solution of degassed toluene (80 mL) and dicyclohexylamine (10 mL), which was then sonicated and centrifuged at 1000 RPM for 10 minutes. A black precipitate and a clear supernatant were obtained. In the next step, 40 mL of degassed DI water was added to the black precipitate as well as 40 mL toluene and 5 mL dicyclohexylamine. The mixture was shaken and sonicated for 10 minutes to mix and disperse everything. The addition of the DI water caused some gas evolution and bubbling. Then, the mixture was sonicated and centrifuged at 1000 RPM for 20 minutes, which resulted in 3 layers: a dark brown organic (top layer), a second slightly cloudy aqueous layer (middle layer) and a small amount of a dark brown/copper color precipitate (bottom layer). The organic layer as well as the precipitate were isolated and stored in a glass vial under Argon and kept in a freezer at −5° C.

Figure 2:
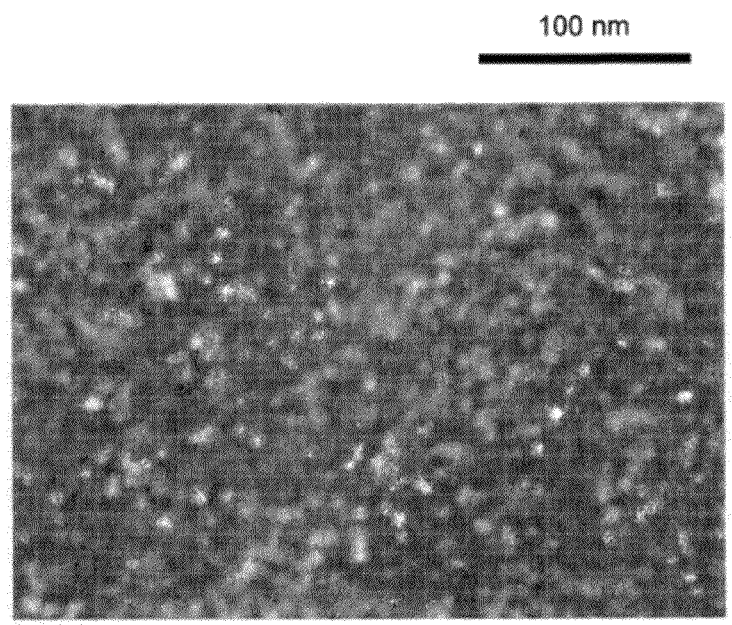
FIG. 2 shows a Secondary Electron Image (SEI) of the surfactant stabilized nanoparticles of the present invention.
Figure 3:
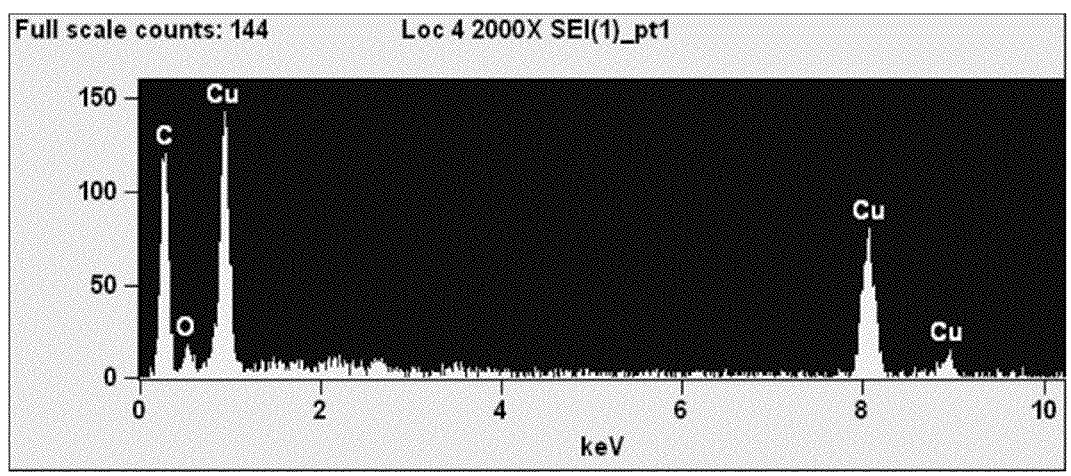
FIG. 3 shows the chemical analysis available via Energy Dispersive Spectroscopy (EDS) during the imaging experiment indicated in FIG. 2.

Scanning Electron Microscope Analysis: A JEOL JSM7001-FLV Scanning Electron Microscope (SEM) was employed in this analysis. In addition to Secondary, Back-scattering and Low Vacuum Imaging, this SEM has a Scanning Transmission Electron Detector (STEM) that produces an image similar to that of a Transmission Electron Microscope (TEM). The SEI image is shown in FIG. 2. Samples were prepared using a dilute organic solution and TEM grids (Cu/Au, carbon coated, 200/300 grid), the specified resolution was 1.2 nm at 30 kV and 3 nm at 1 kV. The magnification range was from 20× to 1,000,000×. The SEM also offers quick chemical analysis using Energy Dispersive Spectroscopy (EDS). The EDS in FIG. 3 shows the copper and carbon from the surfactant shell. The EDS indicates a small quantity of oxygen due to surfactant removal in the vacuum chamber and some oxidation from oxygen back pressure during pump down in collecting the SEM.

SEM Sample Preparation: The organic layer obtained from Reaction Cu53 was used to prepare the Scanning Electron Microscope (SEM) samples. In this particular case, lacey carbon film on 300 mesh gold grid was used for preparation of the SEM sample. A 2 mL glass pipette was used to place 3 drops of the organic solution on the gold grid which was dried in air under the hood.

Figure 4:
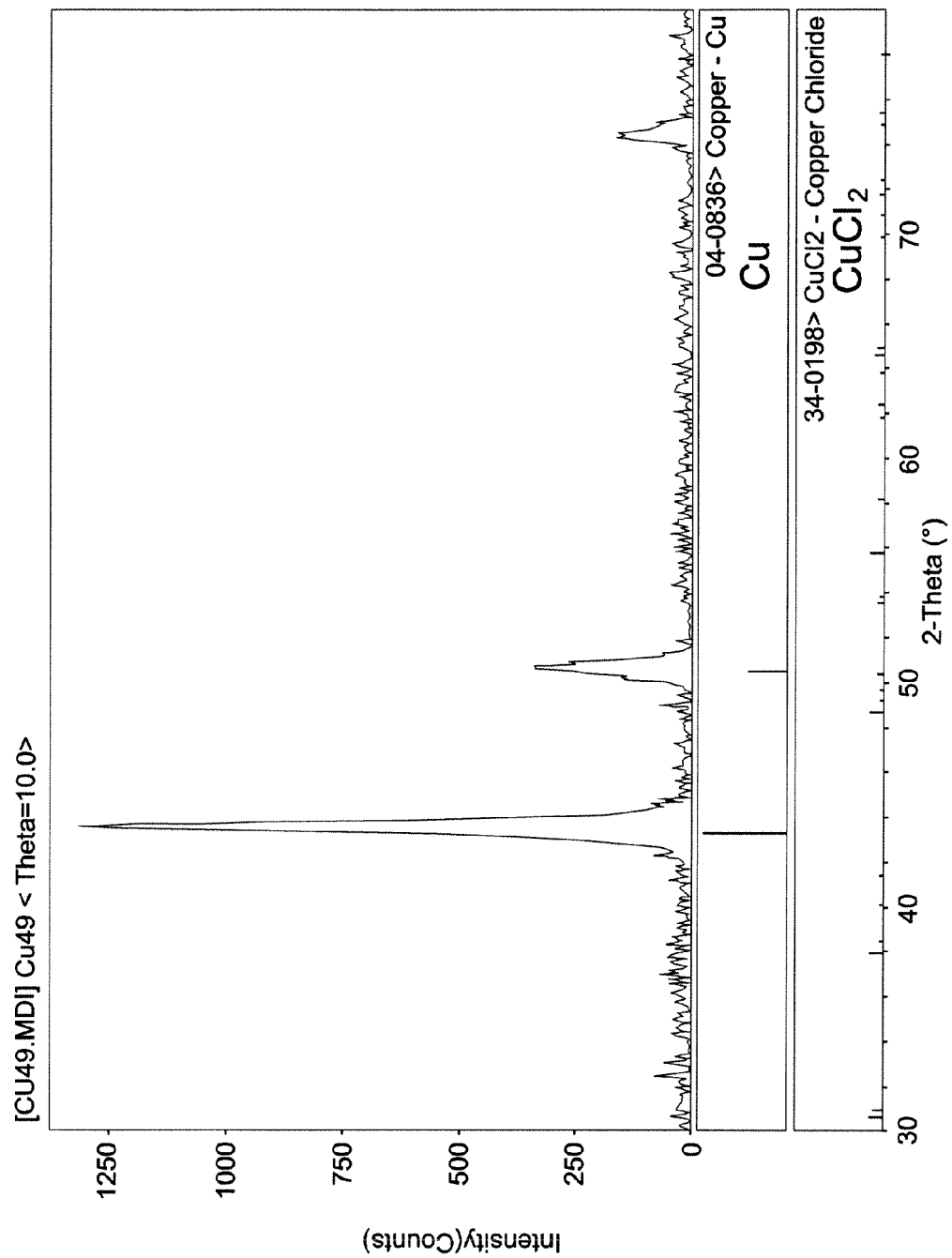
FIG. 4 shows an X-Ray Diffraction (XRD) spectrum of copper nanoparticles of the present invention.

X-Ray Diffraction Analysis: A Siemens D5000 Diffraktometer. Sample preparation: The dark precipitate obtained from reaction Cu53 was isolated and dried in air on a watch glass. A double sided sticky tape (0.5 cm×1 cm) was placed in the center of a standard glass slide. The dark powder was placed on the tape and pressed down for good adhesion such that it covers the entire tape. The glass slide was placed in the XRD sample holder and the run conducted using the following conditions: Range 30°-80°, Step size: 0.1, Dwell time: 12, Deg: 5, Theta: 10°, Laser Voltage (kV) 40 and Current (mA) 30, run time 96 minutes. The XRD spectrum, shown in FIG. 4, indicates the presence of copper metal only, with no precursor copper salt or oxide detected.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is the following:

1. A method comprising:
    providing a copper salt solution comprising a copper (II) salt, an N,N'-dialkylethylenediamine, a C6-C18 alkylamine, and a first organic solvent;
        wherein the N,N'-dialkylethylenediamine comprises branched alkyl groups;
    providing a reducing agent solution comprising a reducing agent and a second organic solvent; and
    combining the copper salt solution with the reducing agent solution, thereby reducing the copper (II) salt to produce copper nanoparticles having a surfactant coating thereon comprising at least the N,N'-dialkylethylenediamine.

2. The method of claim 1, wherein combining the copper salt solution with the reducing agent solution comprises adding the copper salt solution to the reducing agent solution.

3. The method of claim 1, wherein the reducing agent solution also comprises an N,N'-dialkylethylenediamine and a C6-C18 alkylamine.

4. The method of claim 1, wherein the copper salt solution and the reducing agent solution are heated to a temperature between about 30° C. to about 50° C. prior to being combined.

5. The method of claim 4, wherein the copper salt solution and the reducing agent solution are heated to a temperature between about 30° C. to about 50° C. while being combined.

6. The method of claim 1, wherein the C6-C18 alkylamine comprises a C7-C10 alkylamine.

7. The method of claim 1, wherein the first and second organic solvents are anhydrous.

8. The method of claim 1, wherein the copper (II) salt is selected from the group consisting of copper (II) chloride, copper (II) bromide, copper (II) iodide, copper (II) nitrate, copper (II) acetate, copper (II) sulfate, copper (II) formate, and copper (II) oxide.

9. The method of claim 1, wherein the first and second organic solvents comprise triglyme.

10. The method of claim 1, wherein the reducing agent comprises sodium borohydride.

11. The method of claim 1, wherein the copper nanoparticles range from about 1 nm to about 10 nm in size.

12. A method comprising:
    providing a copper salt solution comprising a copper (II) salt, an N,N'-dialkylethylenediamine, a C6-C18 alkylamine, and a first organic solvent;
        wherein the N,N'-dialkylethylenediamine comprises N,N'-di-t-butylethylenediamine;
    providing a reducing agent solution comprising a reducing agent and a second organic solvent; and
    combining the copper salt solution with the reducing agent solution, thereby reducing the copper (II) salt to produce copper nanoparticles having a surfactant coating thereon comprising at least the N,N'-dialkylethylenediamine.

13. A method comprising:
    providing a copper salt solution comprising a copper (II) salt, an N,N'-dialkylethylenediamine, a C6-C18 alkylamine, and a first organic solvent;
    providing a reducing agent solution comprising a reducing agent and a second organic solvent; and
    combining the copper salt solution with the reducing agent solution, thereby reducing the copper (II) salt to produce copper nanoparticles having a surfactant coating thereon comprising at least the N,N'-dialkylethylenediamine;
        wherein the surfactant coating further comprises the C6-C18 alkylamine.

* * * * *